United States Patent [19]

Kawarada

[11] Patent Number: 4,530,035
[45] Date of Patent: Jul. 16, 1985

[54] ELECTRONIC FLASH APPARATUS

[75] Inventor: Osamu Kawarada, Fuchu, Japan

[73] Assignee: Olympus Optical Company Ltd., Tokyo, Japan

[21] Appl. No.: 548,996

[22] Filed: Nov. 7, 1983

[30] Foreign Application Priority Data

Jan. 19, 1983 [JP] Japan .............................. 58-5699[U]
Mar. 15, 1983 [JP] Japan ............................ 58-37946[U]

[51] Int. Cl.³ ............................................ G03B 15/02
[52] U.S. Cl. ..................................... 362/11; 362/184;
362/208; 362/240; 362/241; 362/251; 362/252;
362/297; 362/346; 362/362
[58] Field of Search ................ 362/11, 184, 208, 240,
362/241, 251, 252, 297, 346, 362

[56] References Cited

U.S. PATENT DOCUMENTS 3,783,260  1/1974  Broadt et al. ................... 240/1.3
4,133,023  1/1979  Hanson ............................. 362/11

FOREIGN PATENT DOCUMENTS 56-103430  7/1981  Japan .

Primary Examiner—Stephen J. Lechert, Jr.
Attorney, Agent, or Firm—Louis Weinstein

[57] ABSTRACT

An electronic flash apparatus has a plurality of flashlight projectors comprising flash discharge tubes and reflecting shades for said discharge tubes which projectors are juxtaposed with an opening of each reflecting shade substantially in the same direction, being the depth of said reflecting shades in the projectors constructed so as to be able to establish the substantially same amount of the flashlight emission as with the conventional electronic flash apparatus can be greatly reduced as compared therewith, thereby minimizing the size of the apparatus. In addition, the apparatus is further minimized by disposing a main capacitor for the flashlight emission of the flash discharge tube so as to project into a recess formed between adjacent the plurality of reflecting shades.

6 Claims, 15 Drawing Figures

ELECTRONIC FLASH APPARATUS

BACKGROUND OF THE INVENTION

The present invention relates to an electronic flash apparatus, and more particularly, to such an apparatus capable of providing an increased amount of flashlight emission and applicable to a flash photography of a camera or the like.

As is well known, a conventional electronic flash apparatus applicable to a flash photography and capable of providing an increased amount of flashlight emission (the degree of 40 to 50 in a guide number), as shown in FIGS. 1 and 2, is provided with a flashlight projector 10 the essential parts of which are a reflecting shade 2 which is formed of a curved plate perpendicular to the paper surface and is located opposite to a light emission window 1a of a flash body 1 and a flash discharge tube 3 disposed within the shade 2. The shade 2, as shown in FIG. 3, has a paraboloid portion 2a which is formed at the rear thereof and an ellipsoid portion 2b which is formed at an opening 2c adjacent to the paraboloid portion 2a. The discharge tube 3 is disposed at the focal point of the paraboloid portion 2a in a parallel relationship therewith. The opening 2c is covered with a transparent window plate 4. A main capacitor 5 and a circuit substrate 6 including a booster circuit 6a are adjacently arranged behind the light projector 10. The flash body 1 has a grip 7 which depends downwardly from the bottom of the body 1.

In a conventional electronic flash apparatus of a construction described above, among flashlight rays from the discharge tube 3, light rays reflected by the paraboloid portion 2a are projected forwardly as shown as light rays 3a to 3e in a parallel relationship with the radiation center line 3c of the discharge tube 3 and light rays reflected by the ellipsoid portion 2b are projected forwardly as shown as light rays 3f and 3g in the directions approaching a light axis 3c. An irradiation angle α of the projector 10 is defined by both groups of light rays 3h and 3k which are directly directed toward the upper and lower opening edges of the opening 2c without being reflected by the shade 2.

However, the flashlight source of the discharge tube 3 is practically not a point but is a pipe of a definite diameter (nearly 3 mm) and hence it is difficult to determine the irradiation angle α theoretically. Accordingly, the theoretical irradiation angle α is presently defined by modifying the shape for the most part of ellipsoid portion 2b adjacent to the opening 2c of shade 2 with the method of trial and error. Additionally, the shade 2 of the construction described above is most suitable for a shape to most effectively irradiate light from the tube 3 toward an object being photographed, which has the irradiation angle α of a substantially fixed value of 55° to 60°. Accordingly, an electronic flash apparatus capable of providing an increased amount of flashlight emission such as a guide number of the degree of 40 to 50 has the light projector 10 of an extremely large depth, therefore the apparatus itself becoming large in depth and thus disadvantageously degrading the convenience of portable use and ease of operation of the electronic flash.

In addition, in the conventional electronic flash apparatus, since main capacitor 5 and circuit substrate 6 including booster circuit 6a are adjacently arranged, the depth of flash body 1 is further increased, resulting in that the convenience of portable use and ease of operation of the electronic flash are further degraded.

SUMMARY OF THE INVENTION

It is an object of the invention to provide an electronic flash apparatus in which an electronic flash capable of providing an increased amount of flashlight emission of the guide number of the grade 40 to 50 is easily obtainable by combining a plurality of flashlight projectors without increasing the size as a whole.

It is another object of the invention to provide an electronic flash apparatus in which a plurality of flash discharge tubes and reflecting shades are arranged and a main capacitor is disposed so as to project into a recess which is formed between the reflecting shades of adjacent curved plates.

According to the invention, since a plurality of flashlight projectors comprising a plurality of pairs of flashlight discharge tube and reflecting shade are arranged, the depth of reflecting shades may be remarkably reduced in comparison with the case where the equivalent amount of flashlight emission is obtainable with a conventional apparatus in which one flashlight projector comprising a cooperating flashlight discharge tube and reflecting shade is disposed.

Furthermore, since main capacitors are disposed so as to project into a plurality of recesses which are formed between reflecting shades, the required space for disposing main capacitors can be reduced.

As a result, the depth of the electronic flash body can be greatly reduced and the convenience of portable use and ease of operation of the electronic flash can be also greatly improved.

DESCRIPTION OF THE PREFERRED EMBODIMENTS

Figure 4:
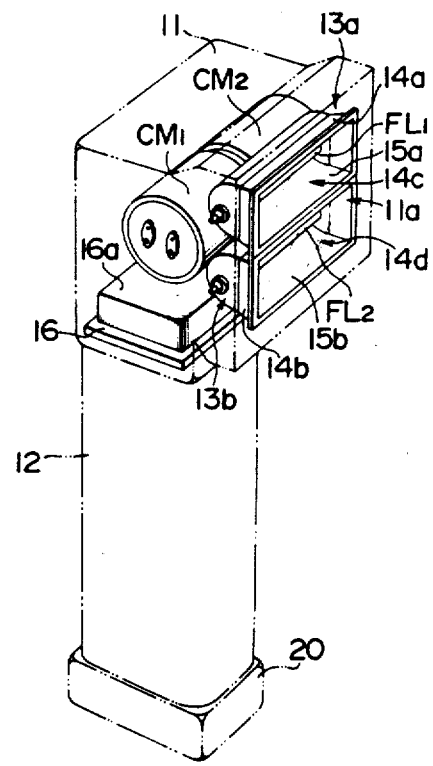
FIG. 4 is a view in perspective of the essential parts of an electronic flash apparatus showing an embodiment of the invention.
Figure 5:
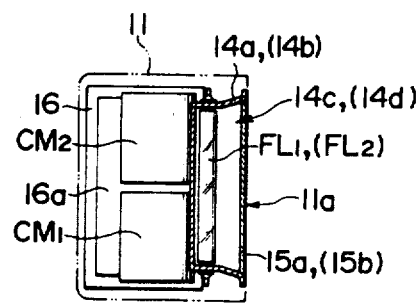
FIG. 5 is a plan view partly in section of the flash apparatus shown in FIG. 4.
Figure 6:
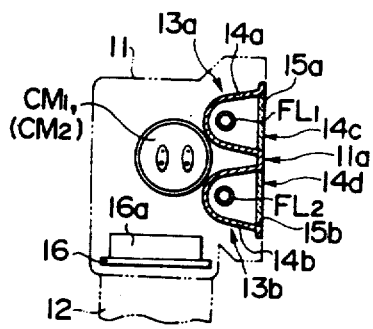
FIG. 6 is a side view partly in section of the flash apparatus shown in FIG. 4.

Referring to FIGS. 4-6, two small-sized flash discharge tubes $FL_1$, $FL_2$ are vertically juxtaposed in parallel so as to face a flash window 11a of an electronic flash body 11. Reflecting shades 14a, 14b which are formed of parabolic plates and which are juxtaposed in vertical alignment so as to cover these tubes $FL_1$, $FL_2$ from the rear thereof have openings 14c, 14d facing forwardly to which transparent window plates 15a, 15b are fitted. Two cylindrical main capacitors $CM_1$, $CM_2$ are arranged behind shades 14a, 14b so as to project into a recess which is formed between shades 14a, 14b and are in axial alignment from side to side to present a long cylinder as a whole (FIGS. 5 and 6). A circuit substrate 16 including a booster circuit 16a is further disposed below main capacitors $CM_1$, $CM_2$.

Figure 7:
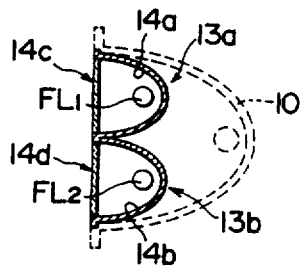
FIG. 7 is a sectional view of a flashlight projector of the flash apparatus shown in FIG. 6.

The discharge tubes $FL_1$, $FL_2$ and reflecting shades 14a, 14b form a first and a second flashlight projector 13a, 13b, respectively, each of which is defined, as shown in FIG. 7, so as to be half the size in its height and depth and half the guide number (for example, the degree of 28) as compared with a flashlight projector 10 (see dotted lines) of the conventional large capacity electronic flash apparatus.

As such, in the electronic flash apparatus in which the same-sized flashlight projectors 13a, 13b are vertically juxtaposed in parallel, a guide number thereof is expressed as follows:

$$\left(\begin{array}{c}\text{The guide number}\\ \text{of each projector}\end{array}\right) \times \left(\begin{array}{c}\text{the number of}\\ \text{projectors}\end{array}\right)^{\frac{1}{2}}$$

For example, $28 \times 2^{\frac{1}{2}} \approx 28 \times 1.4 \approx 39$ is obtained. Accordingly, even in an electronic flash apparatus of large capacity (Guide Number 39), the depth of its reflecting shades 14a, 14b of projectors 13a, 13b, according to the invention, may be greatly reduced in comparison with the conventional electronic flash apparatus having substantially the same degree of guide number. In combination with the construction in which main capacitors $CM_1$, $CM_2$ are arranged so as to project into a recess which is formed between reflecting shades 14a, 14b, it is possible to further reduce the size of the electronic flash apparatus of the invention.

In this case, since flashlight projectors 13a, 13b whose reflection characteristics or the like have been already known are required only to be minimized, their redesign in an irradiation angle α and the like is greatly facilitated and if necessary, it is also possible to adjust the orientation of each of flashlight projectors 13a, 13b.

Figure 8:
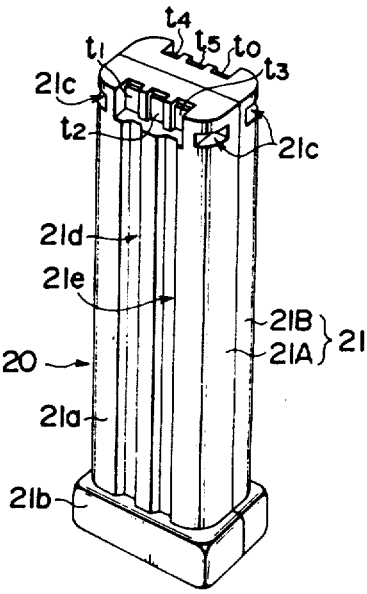
FIG. 8 is a perspective view of a battery containment apparatus to be mounted on the flash apparatus shown in FIG. 4.
Figure 9:
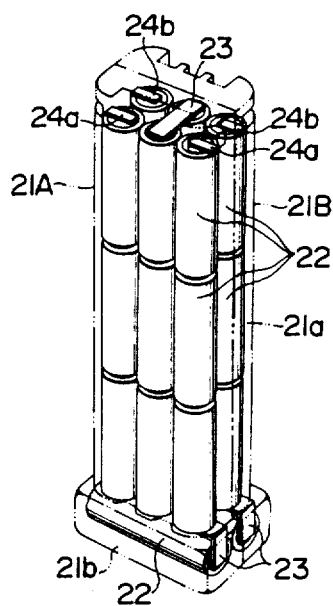
FIG. 9 is a partially sectional view showing the disposition of source batteries within the battery containment apparatus shown in FIG. 8.
Figure 11:
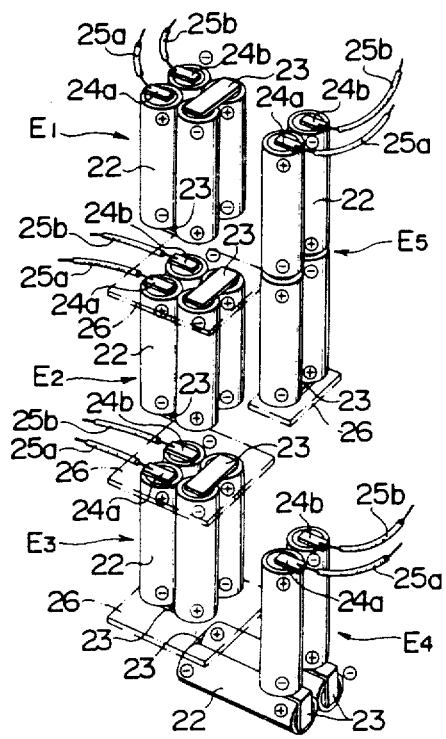
FIG. 11 is an exploded perspective view of the essential parts in connected condition of source batteries within the battery containment apparatus shown in FIG. 8.
Figure 10:
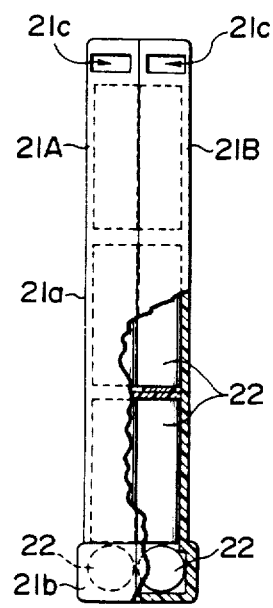
FIG. 10 is a partially broken view showing the disposition of source batteries within the battery containment apparatus shown in FIG. 8.
Figure 12:
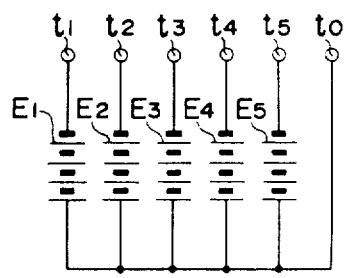
FIG. 12 is a schematic circuit diagram of the battery containment apparatus shown in FIG. 8.

A pipe-shaped grip 12 depends downwardly from the bottom of the electronic flash body 11 and a battery containment apparatus 20 is detachably mounted within the grip 12 from the lower part thereof. The battery containment apparatus 20, as shown in FIG. 8, comprises a pipe-shaped casing 21 formed by a pair of longitudinally split casing halves 21A, 21B disposed in abutting relationship. A hollow rectangular stop 21b formed on the bottom of each casing half. Twenty batteries 22 are received in the casing 21 (see FIG. 9). Each of the batteries 22 comprises a re-chargeable dry cell of A3 type, for example, a nickelcadmium cell. As shown in FIGS. 9 and 10, when they are received into a portion 21a of the casing 21 which is adapted to be inserted into the grip 12, eighteen batteries are stacked together in three tiers which are vertically aligned, each tier including two rows and three columns. When so disposed, these batteries are aligned in the vertical direction. The remaining two cells 22 are horizontally disposed in the direction of the row so as to extend across the three columns and are received within the stop 21b of the casing 21. When the batteries 22 are contained within the casing 21, they are divided into five banks of four batteries each, as shown in FIG. 11, and the batteries 22 in each bank are electrically connected in series, thus defining five d.c. sources $E_1$ to $E_5$. Specifically, four batteries 22 disposed in the upper tier in the two leftmost columns are connected in series to define a first d.c. source $E_1$. Four batteries 22 disposed in the middle tier in the two left-most columns are connected in series to define a second d.c. source $E_2$. Four batteries 22 disposed in the lower tier in the two left-most columns are connected in series to define a third d.c. source $E_3$. Two batteries 22 horizontally disposed in the lowest tier and two other batteries 22 disposed in the lower tier in the right-most column are connected in series to define a fourth d.c. source $E_4$. Four batteries disposed in the upper and middle tier in the right-most column are connected in series to define a fifth d.c. source $E_5$. Individual batteries 22 are disposed to locate the indicated poles in a manner as shown in FIG. 11, and four batteries 22 in each bank are connected in series with each other by utilizing either as many three or as few as one conductive piece 23 which interconnects adjacent poles of opposite polarities except for the poles which are located at the opposite ends of the series connection. The positive pole of each of the first to the fifth d.c. sources $E_1$ to $E_5$ is connected through a lead conductor 24a and a lead wire 25a to an output $t_0$ which is common to all of the sources. As shown in FIG. 8, the output terminal $t_0$ is disposed in a recess formed in the upper end of the sidewall of the right-hand casing half 21B. The negative poles of the first to the fifth d.c. source $E_1$ to $E_5$ are connected through respective lead conductors 24b and lead wires 25b to five negative pole output terminals $t_1$ to $t_5$ separately, which are disposed in recesses formed in the upper end of the sidewall of the casing halves 21A, 21B. Consequently, the electrical circuit of the apparatus 20 can be represented as shown in FIG. 12. It is to be understood that each of the d.c. sources $E_1$ to $E_5$ is packaged in an insulating sheet 26 formed of a thermoplastic resin such as vinyl chloride resin so as to be insulated from each other when received within the casing 21. After the batteries are received in the casing 21, the casing, halves 21A and 21B are secured together as by set screws, not shown for purposes of simplicity thereby preventing any battery from being inadvertently removed from the casing.

The recesses in which the output terminals $t_0$ to $t_5$ are disposed are formed in the left- and right-hand sidewalls 21A, 21B of the casing 21 so that three recesses are spaced apart in the direction of the row on each side. The output terminals $t_0$ to $t_5$ are separately formed in each recess. Adjacent to its upper end, the end walls of the casing 21 are formed with pairs of laterally spaced detent grooves 21c which serve a click stop action. The purpose of these detent grooves is to provide a temporary anchorage of the apparatus 20 to the flash body 11 by engagement with leaf springs (not shown) disposed in the latter whenever the apparatus 20 is inserted into the grip 12, as indicated in FIG. 4. A pair of longitudinal flutes 21d and 21e are formed in the left-hand sidewall of the casing 21 and are spaced apart a given distance. The flutes 21d, 21e cooperate with ribs (not shown) formed on the internal surface of the grip 12 to prevent an inadvertent insertion of the apparatus 20 into the flash body 11 in an improper orientation, since then the output terminals $t_0$ to $t_5$ will not be properly connected within the flash body 11. In addition, when the apparatus 20 is mounted in the flash body 11, the bottom surface of the grip 12 will bear against the upper surface of the stop 21b which slightly projects beyond the casing portion 21a. The stop 21b is effective also to prevent the apparatus from being inserted excessively deep into the flash body 11.

Figure 13:
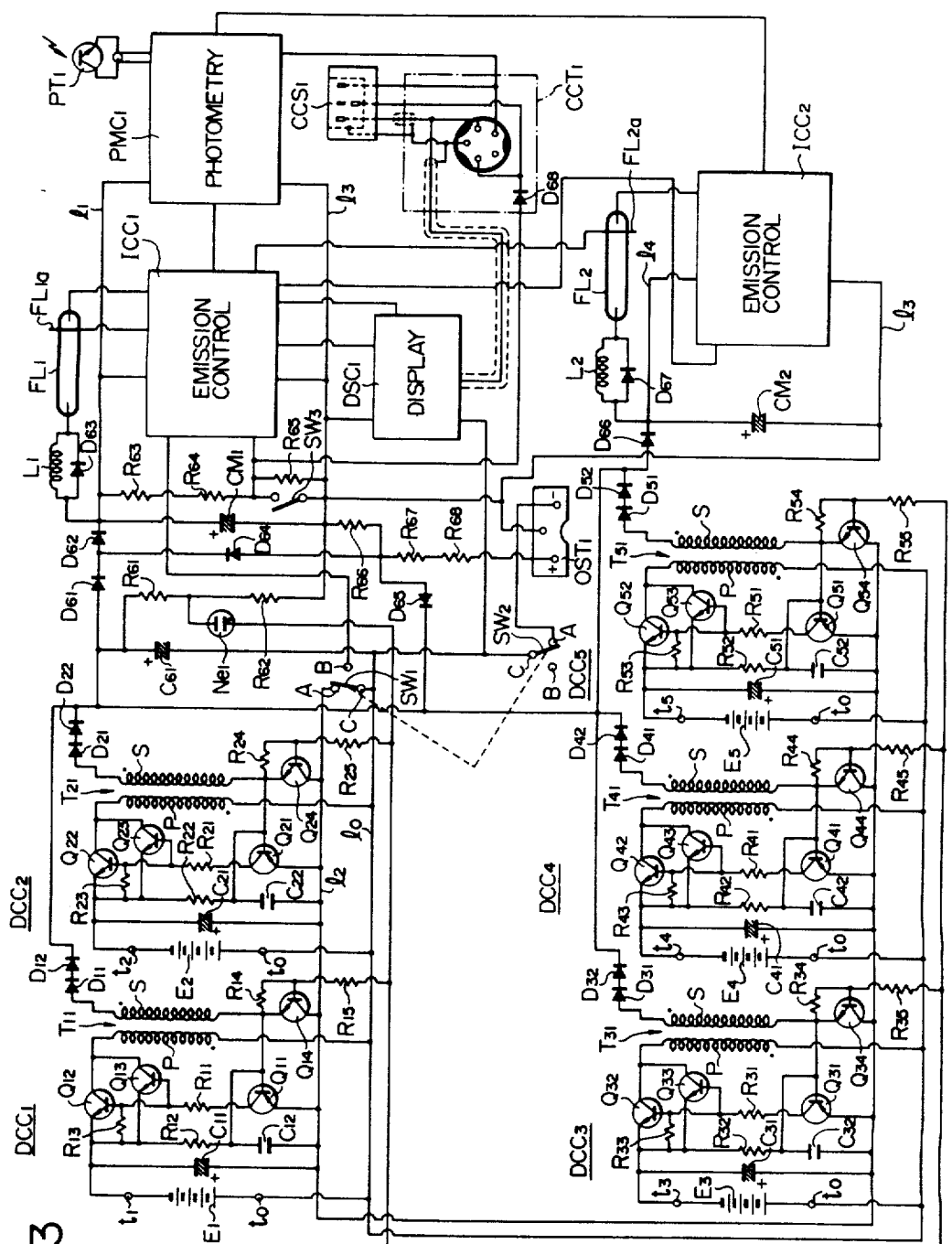
FIG. 13 is a circuit diagram of the electronic flash apparatus shown in FIG. 4.

When the apparatus 20 is mounted in the flash body 11 in the manner mentioned above, the positive terminal $t_0$ and the negative output terminals $t_1$ to $t_5$ separately engage mating input terminals (not shown) formed inside the flash body 11, whereby the first to the fifth d.c. sources $E_1$ to $E_5$ are connected to the electrical circuit of the electronic flash apparatus which is shown in FIG. 13. As shown, the electrical circuit of the electronic flash apparatus includes five DC-DC converters $DCC_1$ to $DCC_5$, which are identical in design, but which are separately driven by one of the d.c. sources $E_1$ to $E_5$. These five converters are used to charge a pair of main capacitors $CM_1$ and $CM_2$ in order to enable the emission of flashlight from the pair of flash discharge tubes $FL_1$, $FL_2$.

Since the converters are designed in an identical manner as mentioned previously, only the converter $DCC_1$ will be specifically described. The converter comprises a step-up transformer $T_{11}$, feedback transistor $Q_{11}$ of PNP type, main transistors $Q_{12}$ and $Q_{13}$ of NPN type, a switching transistor $Q_{14}$ of NPN type, a current superimposing capacitor $C_{11}$, a capacitor $C_{12}$ which is used to bypass a back e.m.f. from the transistor $Q_{11}$, rectifier diodes $D_{11}$, $D_{12}$ and resistors $R_{11}$ to $R_{15}$. The first d.c. source $E_1$ has its positive pole connected through the common positive output terminal $t_0$ to a common ground bus $l_0$ and has its negative pole connected through the first output terminal $t_1$ to the emitters of the main transistors $Q_{12}$, $Q_{13}$. The transformer $T_{11}$ has a primary winding P, one end of which is connected to the ground bus $l_0$ and the other end of which is connected to the collectors of the main transistors $Q_{12}$, $Q_{13}$. The transformer $T_{11}$ also has a secondary winding S, one end of which is connected to the base of the feedback transistor $Q_{11}$ and to the emitter of the switching transistor $Q_{14}$, and the other end of which is connected to the anode of the rectifier diode $D_{11}$. The feedback transistor $Q_{11}$ has its emitter connected to a supply bus $l_2$ and its collector connected through resistor $R_{11}$ to the bases of the main transistors $Q_{12}$, $Q_{13}$. The base of the transistor $Q_{11}$ is connected through resistor $R_{12}$ to the emitters of the main transistors $Q_{12}$, $Q_{13}$ and is also connected through capacitor $C_{12}$ to the bus $l_2$. Resistor $R_{13}$ is connected across the base and emitter of the main transistors $Q_{12}$, $Q_{13}$, and the capacitor $C_{11}$ is connected between the emitters of the main transistors $Q_{12}$, $Q_{13}$ and the bus $l_2$. The switching transistor $Q_{14}$ has its collector connected to the bus $l_2$, and its base connected through resistor $R_{14}$ to the emitter of the transistor $Q_{14}$ and also connected through resistor $R_{15}$ to one end of a neon lamp Nel which operates to indicate the completion of a charging operation. The cathode of the rectifier diode $D_{11}$ is connected to the anode of the rectifier diode $D_{12}$.

Other converters $DCC_2$ to $DCC_5$ are quite similarly constructed as the above-mentioned converter $DCC_1$, and therefore corresponding parts are designated by like reference numerals, to which FIGS. 10, 20, 30 and 40 are added, respectively.

The cathodes of the rectifier diodes $D_{12}$, $D_{22}$, $D_{32}$, $D_{42}$ and $D_{52}$, which represent the output of each converter $DCC_1$ to $DCC_5$, are connected to one end of a capacitor $C_{61}$ which is used to detect the charged voltage. These cathodes are also connected through diodes $D_{61}$, $D_{62}$ to one end of one of the main capacitors, $CM_1$, and also connected through a diode $D_{66}$ to one end of the other main capacitor $CM_2$. The other end of the capacitor $C_{61}$ is connected to the common bus $l_0$, and this capacitor is adapted to be charged to the same voltage as the main capacitors $CM_1$, $CM_2$ which have their other end connected to the bus $l_0$ through a display circuit $DSC_1$. The capacitor $C_{61}$ is shunted by a series combination of resistors $R_{61}$ and $R_{62}$, with the junction therebetween being connected to the other end of the neon lamp Nel. Thus, the voltage to which the capacitor $C_{61}$ is charged is divided by the resistors $R_{61}$ and $R_{62}$, and when the voltage across the resistor $R_{62}$ exceeds an illumination initiate voltage of the neon lamp Nel, the charge stored across the capacitor $C_{61}$ flows through the resistor $R_{61}$ and the neon lamp Nel to the bases of the switching transistors $Q_{14}$, $Q_{24}$, $Q_{34}$, $Q_{44}$ and $Q_{54}$, respectively, thus turning them on while turning the feedback transistors $Q_{11}$, $Q_{21}$, $Q_{31}$, $Q_{41}$ and $Q_{51}$ off. The converters $DCC_1$ to $DCC_5$ then cease to operate. The capacitor $C_{61}$ has a capacitance value which is substantially reduced as compared with the capacitance of the main capacitors $CM_1$ and $CM_2$, and hence the capacitor $C_{61}$ discharges rapidly to cause the neon lamp Nel to be extinguished, whereupon the converters $DCC_1$ to $DCC_5$ resume their operation to charge the capacitor again. In this manner, the capacitor $C_{61}$ repeats a charging and a discharge operation, and cooperates with the lamp Nel and the transistors $Q_{14}$ to $Q_{54}$ to maintain the voltage across the main capacitors $CM_1$ and $CM_2$ substantially at a given level.

A power switch $SW_1$ is connected across the buses $l_2$ and $l_0$. The power switch $SW_1$ is in the form of a changeover switch having a movable contact C connected to the bus $l_0$ and having a fixed contact A connected to the bus $l_2$. When the switch $SW_1$ is thrown to bring the movable contact to engage the fixed contact A, a path across the buses $l_0$, $l_2$ is completed through the switch $SW_1$, feeding the individual converters $DCC_1$ to $DCC_5$. The switch $SW_1$ also has another fixed contact B connected to one of emission control circuits, $ICC_1$. When the switch is thrown to the fixed contact B, the converters cease to be fed and hence cease to operate, and simultaneously an emission inhibit signal is supplied to the emission control circuit $ICC_1$, preventing the emission of flashlight from the flash discharge tubes $FL_1$ and $FL_2$.

The power switch $SW_1$ is mechanically interlocked with another power switch $SW_2$ which is also in the form of a changeover switch. The power switch $SW_2$ has a movable contact C connected to the common bus $l_0$ and a fixed contact A connected to a contact of negative polarity of a terminal assembly $OST_1$ associated with an external power supply. The switch $SW_2$ has also another fixed contact B which is left without connection. The terminal assembly $OST_1$ has a contact for positive polarity, which is connected through resistors $R_{68}$ and $R_{67}$ to the anode of diode $D_{64}$, to the anode of diode $D_{65}$ and to one end of resistor $R_{66}$. The cathode of diode $D_{64}$ is connected to the junction between diodes $D_{61}$ and $D_{62}$, and the cathode of diode $D_{65}$ is connected to the anodes of diodes $D_{61}$ and $D_{66}$. The other end of resistor $R_{66}$ is connected to a supply bus $l_3$ which is in turn connected to the other end of the main capacitors $CM_1$ and $CM_2$. The bus $l_3$ is connected to the common bus $l_0$ through the display circuit $DSC_1$. The terminal assembly $OST_1$ also has a common ground contact which is connected to the bus $l_3$. Accordingly, when an external power supply is connected with the terminal assembly $OST_1$ and the power switch $SW_2$ is thrown to its fixed contact A, the main capacitors $CM_1$ and $CM_2$ can be charged from the external power supply.

The emission control circuit $ICC_1$ is connected across buses $l_1$, $l_3$ which are connected with the opposite ends of the main capacitor $CM_1$. A series combination of the flash discharge tube $FL_1$ and a parallel combination of a coil $L_1$ and diode $D_{63}$ is connected between the bus $l_1$ and the circuit $ICC_1$. The other emission control circuit $ICC_2$ is connected between buses $l_4$ and $l_3$ which are in turn connected with the opposite ends of the other main capacitor $CM_2$. A series combination of the other flash discharge tube $FL_2$ and a parallel combination of a coil $L_2$ and diode $D_{67}$ is connected between the bus $l_4$ and the circuit $ICC_2$. The flash discharge tubes $FL_1$ and $FL_2$ have trigger electrodes $FL_{1a}$ and $FL_{2a}$ which are connected to the emission control circuit $ICC_1$ so as to initiate the emission of their flashlight in response to an output from the latter circuit.

A series combination of resistors $R_{63}$, $R_{64}$ and a trigger switch $SW_3$, which is used to provide a test of the emission of flashlight, is connected in shunt with the main capacitor $CM_1$. The trigger switch $SW_3$ is shunted by a resistor $R_{65}$, with the junction between the resistor $R_{64}$ and the switch $SW_3$ being connected to the emission control circuit $ICC_1$ and also connected through a diode $D_{68}$ to a contact assembly $CCS_1$ and a connector $CCT_1$ for connection with a photographic camera. Thus, the emission control circuit $ICC_1$ can be triggered by a signal fed from an associated camera or by the closure of the switch $SW_3$, thus initiating the emission of flashlight from the discharge tubes $FL_1$ and $FL_2$.

The display circuit $DSC_1$ operates to indicate the completion of a charging operation and an automatic emission control within the electronic flash or the camera. This circuit is connected to both the contact assembly $CCS_1$ and the connector $CCT_1$ through a shielded cable. The circuit $DSC_1$ is fed from the emission control circuit $ICC_1$.

A photometric circuit $PMC_1$ is connected across the buses $l_1$ and $l_3$. A photoelectric transducer element $PT_1$ is connected to the photometric circuit $PMC_1$, which operates to integrate a photocurrent produced by the transducer element $PT_1$ in order to provide an automatic emission control signal fed to the emission control circuits $ICC_1$ and $ICC_2$ whenever a given exposure level is reached. It also procudes an automatic emission control signal which is supplied to the emission control circuits $ICC_1$ and $ICC_2$ in response to a signal from an associated camera which is fed through the contact assembly $CCS_1$ or the connector $CCT_1$.

In operation, when the power switch $SW_1$ is thrown to its fixed contact A, the converters $DCC_1$ to $DCC_5$ are fed from the d.c. sources $E_1$ to $E_5$, respectively, through the supply bus $l_2$, thus initiating their operation. Each of these converters operates in an identical manner, and hence the operation of only the converter $DCC_1$ will be described. Initially, there occurs a current flow through the emitterbase path of the feedback transistor $Q_{11}$ and the resistor $R_{12}$, thus turning this transistor $Q_{11}$ on. Simultaneously, a charging current flows through the capacitor $C_{11}$, which is therefore charged with a polarity so that its terminal connected to the bus $l_2$ is positive. As the transistor $Q_{11}$ is turned on, the main transistors $Q_{12}$ and $Q_{13}$ are turned on, whereby there is produced a current flow through the primary winding P of the step-up transformer $T_{11}$ by a current drain from the source $E_1$ and the charge stored on the capacitor $C_{11}$.

A current flow through the primary winding of the transformer $T_{11}$ develops a high induced voltage across the secondary winding S thereof, whereby a positive feedback current flows from the main capacitors $CM_1$ and $CM_2$, further increasing the current flow through the primary winding. After the current flow through the primary winding has increased to a degree and then begins to decrease, the back e.m.f. developed across the secondary winding S is applied to the base of the feedback transistor $Q_{11}$, turning it off. The back e.m.f. is buffered by the capacitor $C_{12}$, which thus operates to prevent the transistor $Q_{11}$ from being destroyed. When the transistor $Q_{11}$ turns off, the main transistors $Q_{12}$ and $Q_{13}$ also turn off, whereby the inductive energy stored in the primary winding P produces a back e.m.f., which produces an oscillating voltage to be produced by an LC oscillating circuit comprising the inductance and a variety of distributed capacitances formed in the winding and the common bus. The oscillating voltage is transmitted from the primary winding P to the secondary winding S, and during a cycle when the transistor $Q_{11}$ is positively biased by secondary winding S, the transistor $Q_{11}$ is turned on as are the main transistors $Q_{12}$ and $Q_{13}$. The described process is then repeated to sustain the oscillation.

Other converters $DCC_2$ to $DCC_5$ produce a selfmaintained oscillation in a manner similar to that mentioned above in connection with the converter $DCC_1$. During such oscillation, the positive feedback current flows to the main capacitors $CM_1$ and $CM_2$ through the combinations of rectifier diodes $D_{11}$, $D_{12}$; $D_{21}$, $D_{22}$; $D_{31}$, $D_{32}$; $D_{41}$, $D_{42}$; and $D_{51}$, $D_{52}$, thus charging the main capacitors. The above-mentioned combinations of rectifier diodes prevent the occurrence of circulating currents which may flow between different converters $DCC_1$ to $DCC_5$ if these converters oscillate with different phases. When the main capacitors $CM_1$ and $CM_2$ are charged to a given level, the neon lamp Nel is illuminated due to the charging of capacitor $C_{61}$, and the resulting current flow turns the switching transistors $Q_{14}$ to $Q_{54}$ on through resistors $R_{15}$-$R_{55}$, thus causing the converters $DCC_1$ to $DCC_5$ to cease their operation temporarily.

Figure 1:
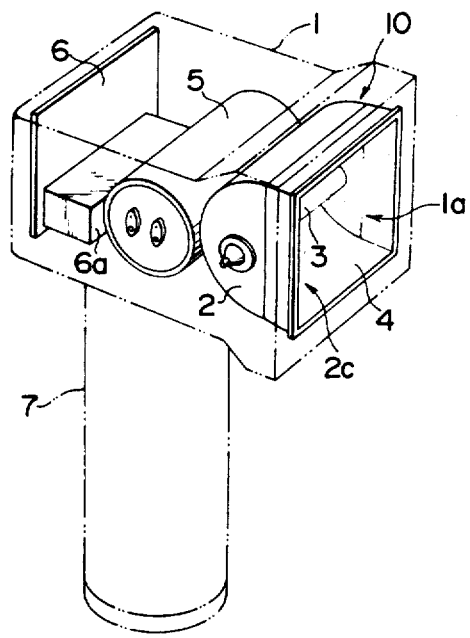
FIG. 1 is a view in perspective of the essential parts of a conventional electronic flash apparatus.
Figure 2:
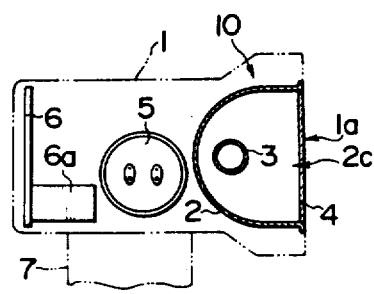
FIG. 2 is a side view partly in section of the essential parts of the flash apparatus shown in FIG. 1.
Figure 3:
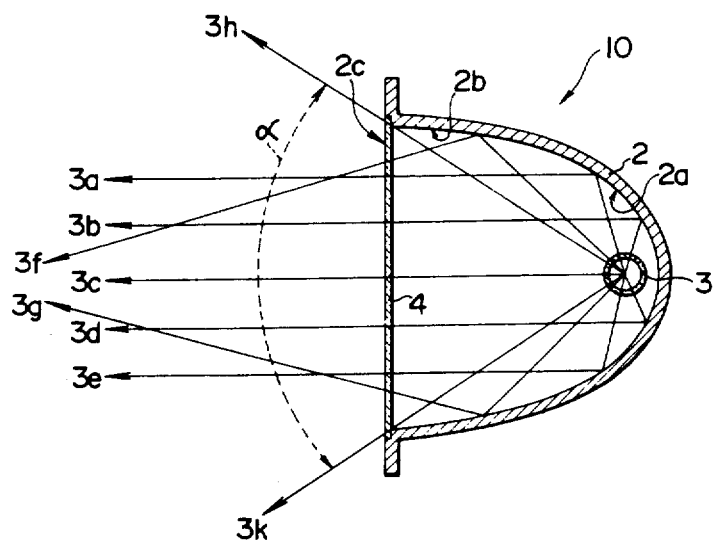
FIG. 3 is a view showing the state of projecting flashlight rays from a flashlight projector of the flash apparatus shown in FIG. 1.

Under the condition that the main capacitors $CM_1$ and $CM_2$ have been charged to a predetermined voltage, when a synchronizing contact of a camera (not shown) is closed or the trigger switch $SW_3$ for test flashing of the flash apparatus is closed, a high voltage is applied through the emission control circuit $ICC_1$ to trigger electrodes $FL_{1a}$, $FL_{2a}$ to enable the simultaneous emission of flashlight from the discharge tubes $FL_1$, $FL_2$. At this time, the sum of the emission of flashlight from the tubes $FL_1$, $FL_2$ is substantially equal to that of a large capacity flash discharge tube 3 (FIG. 1) in the conventional electronic flash apparatus. Then, when an automatic interruption signal is inputted through the photometry circuit $PMC_1$ to the emission control circuits $ICC_1$, $ICC_2$ in the course of the flashing, the emission of flashlight from the discharge tubes $FL_1$, $FL_2$ is interrupted.

In the foregoing embodiment, while a pair of main capacitors $CM_1$ and $CM_2$ are charged through a plurality of d.c. sources $E_1$ to $E_5$ and DC-DC converters $DCC_1$ to $DCC_5$, these capacitors may be charged by a single drive power source. However, with the embodiment of the invention it is possible to form the booster circuit 16a smaller and more compact then conventional booster circuits because of the miniaturization and the increase of the degree of freedom of the arrangement of electric parts constructing the DC-DC converters $DCC_1$ to $DCC_5$, resulting in still further miniaturization of electronic flash body 11.

Figure 14:
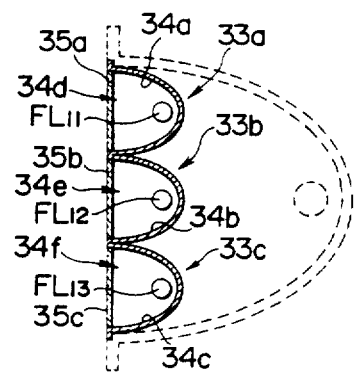
FIG. 14 is a sectional view of a flashlight projector of the electronic flash apparatus showing another embodiment of the invention.

A flashlight projector of an electronic flash apparatus showing another embodiment in FIG. 14 has an integral construction in which three flashlight projectors 33a, 33b, 33c of the same shape and size as flashlight projectors 13a, 13b shown in FIG. 7 are juxtaposed in parallel and vertical alignment with respective openings 34d to 34f of reflecting shades 34a to 34c in the same orientation. Accordingly, the guide number of the electronic flash apparatus in which the above-mentioned flashlight projectors are disposed is determined in accordance with the aforesaid expression as follows:

$$28 \times 3^{\frac{1}{2}} \approx 28 \times 1.7 \approx 48$$

As a consequence, the apparatus of the embodiment can be greatly reduced in the depth of reflecting shades 34a to 34c, as compared with a conventional electronic flash apparatus having the substantially same degree of the guide number, as shown in dotted fashion in FIG. 14. Letters $FL_{11}$, $FL_{12}$, $FL_{13}$ represent respective flash discharge tubes and letters 35a, 35b, 35c represent respective transparent windows.

Figure 15:
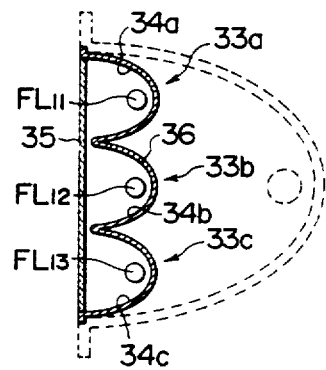
FIG. 15 is a sectional view of a further embodiment of a reflecting shade of the flashlight projector shown in FIG. 14.

In addition, as shown in FIG. 15, the reflective shades 34a to 34c may be integrally formed from a single plate 36. It is to be noted that the reflecting shades 34a to 34c can be readily formed and arranged. Numeral 35 represents a transparent window plate.

It will be understood that as shown in FIGS. 14 and 15, even when three flashlight projectors 33a to 33c or more are provided, the same beneficial effects as with the embodiment shown in FIG. 7 can be obtained.

What is claimed is:

1. An electronic flash apparatus, comprising:
   a plurality of flashlight projectors, each being comprised of a flash discharge tube and a reflecting shade, said tubes being arranged in parallel relationship with one another;
   each of said reflecting shades being formed of curved plates and each being arranged behind one of said plurality of flash discharge tubes;
   said plurality of flashlight projectors being juxtaposed with each opening of said reflecting shades facing substantially in the same direction;
   capacitor means providing power for all of said flash discharge tubes; and
   circuit means for triggering all of said flash dischrge tubes substantially simultaneously.

2. An electronic flash apparatus according to claim 1, in which said capacitor means comprises a main capacitor for the flashlight emission of said flash discharge tubes which is disposed so as to project at least partially into a recess formed between adajcent ones of said plurality of reflecting shades.

3. An electronic flash apparatus according to claim 1, in which said plurality of reflecting shades are integrally formed and processed from a single plate.

4. An electronic flash apparatus comprising:
   a plurality of flashlight projectors, each having a flash discharge tube and a reflecting shade;
   said flash discharge tubes being arranged in spaced substantially parallel fashion;
   each of said reflecting shades being formed of curved plates arranged behind its associated flash discharge tube;
   each of said reflecting shades having an opening through which direct light from the flash discharge tube and light reflected from said reflecting shade is emitted;
   the opening of said flashlight projectors being arranged to direct the emitted light in substantially the same direction;
   capacitor means providing power for all of said flash discharge tubes;
   circuit means for triggering all of said flash discharge tubes substantially simultaneously.

5. The electronic flash apparatus of claim 4, further comprising:
   a pipe-like grip;
   a housing arranged on one end of said pipe-like grip for housing said flashlight projectors;
   battery containment means for receiving a plurality of groups of batteries and being removably received by said pipe-like grip;
   said circuit means being arranged in said housing and electrically coupled to said battery containment means and said flash tubes for operating said flash tubes.

6. The electronic flash apparatus of claim 5, wherein said circuit means includes said capacitor means having at least one main capacitor for storing electrical energy for operating said flash tubes, said main capacitor extending at least partially into the recess between adjacent ones of said reflecting shades.

* * * * *

UNITED STATES PATENT AND TRADEMARK OFFICE
CERTIFICATE OF CORRECTION

PATENT NO. : 4,530,035

DATED : July 16, 1985

INVENTOR(S) : Osamu Kawarada

It is certified that error appears in the above-identified patent and that said Letters Patent is hereby corrected as shown below:

In the Abstract:

Line 14 after "adjacent" insert --ones of--.

In the Specification:

Column 3, line 67 after "21b" insert --is--.

Column 4, line 35 after "many" insert --as--.

Column 4, lines 58 and 59, change ", not shown for purposes of simplicity" to --(not shown for purposes of simplicity),--.

Column 8, lines 55 and 56, change "due to the charging of capacitor $C_{61}$," to --(due to the charging of capacitor $C_{61}$),--.

Column 8, line 58 change "through resistors $R_{15}$-$R_{55}$," to --(through resistors $R_{15}$-$R_{55}$),--.

Column 9, line 15 change "then" to --than--.

Column 9, line 16 after "circuits" insert --,--.

Signed and Sealed this

Third Day of December 1985

[SEAL]

Attest:

DONALD J. QUIGG

Attesting Officer     Commissioner of Patents and Trademarks